United States Patent
Bruzzone et al.

[19]

[11] Patent Number: 6,166,797
[45] Date of Patent: Dec. 26, 2000

[54] DIFFUSION BARRIER LAYERS WITH MICROSTRUCTURED SPACING MEMBERS FOR LIQUID CRYSTAL DISPLAY PANEL SUBSTRATES

[75] Inventors: Charles L. Bruzzone; Richard J. Pokorny; Patrick A. Thomas; David J. W. Aastuen; Timothy J. Gardner; Raghunath Padiyath, all of St. Paul, Minn.

[73] Assignee: 3M Innovative Properties Company, St. Paul, Minn.

[21] Appl. No.: 08/907,744

[22] Filed: Aug. 8, 1997

[51] Int. Cl.⁷ .................................................. G02F 1/1339
[52] U.S. Cl. ........................... 349/155; 349/156; 349/158
[58] Field of Search ................................... 349/155, 156, 349/158

[56] References Cited

U.S. PATENT DOCUMENTS

| | | | |
|---|---|---|---|
| 3,863,332 | 2/1975 | Leupp et al. | 349/156 |
| 3,978,580 | 9/1976 | Leupp et al. | 349/156 |
| 4,720,173 | 1/1988 | Okada et al. | 349/156 |
| 5,499,128 | 3/1996 | Hasegawa et al. | 349/155 |
| 5,545,280 | 8/1996 | Wenz | 156/234 |
| 5,771,084 | 6/1998 | Fujimori et al. | 349/156 |
| 5,793,457 | 8/1998 | Tamai et al. | 349/156 |

FOREIGN PATENT DOCUMENTS

196 02 632
A1  1/1996  Germany.

*Primary Examiner*—James A. Dudek
*Attorney, Agent, or Firm*—Robert J. Pechman

[57] ABSTRACT

Substrate elements for making liquid crystal display devices are disclosed as well as display devices using such elements. A substrate element includes a base sheet having the desired optical properties and providing the structural stability for the substrate element. The substrate element further includes a microstructured barrier layer that protects the base sheet from adverse chemical reactions with the liquid crystal or alignment layer solvents. The microstructured barrier layer comprises a plurality of microstructured spacing members that provide precise, uniform spacing between the first substrate element and a second substrate element. A pair of substrate elements, at least one of which having a microstructured barrier layer, can thereby be mated to form a display device. The substrate elements of the present invention allow large area, high resolution displays to be fabricated which will provide uniform display properties throughout the display area.

9 Claims, 4 Drawing Sheets

DIFFUSION BARRIER LAYERS WITH MICROSTRUCTURED SPACING MEMBERS FOR LIQUID CRYSTAL DISPLAY PANEL SUBSTRATES

FIELD OF THE INVENTION

The present invention relates to a substrate construction useful for making liquid crystal displays and display devices. More particularly, this invention relates to structured layers on plastic or glass based substrates where the structured layer maintains the necessary uniform spacing between device walls and provides a barrier to chemical interactions with the substrate base material.

BACKGROUND OF THE INVENTION

Liquid crystal display (LCD) devices are well known and are useful in a number of applications where light weight, low power and a flat panel displays are desired. Typically, these devices comprise a pair of sheet-like, glass substrate elements, or "half-cells," overlying one another with liquid crystal material confined between the glass substrates. The substrates are sealed at their periphery with a sealant to form the cell or device. Transparent electrodes are generally applied to the interior surface of the substrates to allow the application of an electric field at various points on the substrates thereby forming addressable pixel areas on the display. Examples of useful liquid crystal materials are twisted nematic, super twisted nematic and ferroelectric liquid crystal mixtures.

It is desirable to manufacture large area displays of relatively light weight for use in portable devices such as computers, overhead projectors and the like. Certain organic, polymeric substrates are much lighter than glass and are therefore preferred for use over glass in large area, lightweight displays. However, these substrates tend to be more flexible than glass and must be separated by a dense population of spacers to maintain uniform separation between the closely spaced half cells forming the LCD device. This problem is even more severe with surface stabilized ferroelectric liquid crystal displays which require a nominal 2 $\mu$m spacing controlled to within 0.1 $\mu$m for good results to produce a uniform electric field at low voltages and show uniform contrast across the entire display area. This uniform spacing is required to provide precise control of the shallow cavity containing the liquid crystal material.

Means for achieving the required spacing uniformity include using either precisely dimensioned, short-length polymeric fibers or spheres as in U.S. Pat. No 4,501,471 or spacing members made of photoresist material bonded to the substrate as in U.S. Pat. No. 4,720,173. Each of these methods has deficiencies. Fiber and spheroidal spacing particles are not easily placed uniformly on the substrate to maintain even spacing over the entire area and fibers may overlap to increase the spacer height. Moreover, when the device flexes or is otherwise physically stressed, the spacers may shift or migrate to cause starved areas in the display cell. Bonded structural members must be precisely positioned on each substrate with exactly the same height, a feat that is difficult given the dimensions and tolerances required for effective liquid crystal displays. If members have different chemical composition from the substrate, differential thermal expansion may occur, which causes possible fracture of the bond at the interface and shifting of the spacing member.

Many of these deficiencies were addressed by imparting polymeric substrates with a microstructure comprising uniform height ridges to maintain uniform cell gaps as disclosed in U.S. Pat. No. 5,268,782 (Wenz), which is incorporated herein by reference. The microstructured substrate disclosed by Wenz provided spacers that would not shift or fracture because the microstructure was physically and chemically integral with the substrate. Therefore, no bonding was required between the spacers and the substrate with which they were integral. In addition, the fabrication of the microstructured substrate could be controlled well within a 0.1 $\mu$m or less tolerance even over large areas (tens and hundreds of square centimeters), making it possible to construct large area, light weight displays while preserving uniform contrast across the display.

One primary difficulty with the Wenz approach is that all currently available thermoplastic polymer materials suitable for the formation of the microstructured ridges and having the desired optical properties tend to be soluble in or to absorb either the liquid crystal mixtures or alignment layer solvents during processing, operation, and storage of the devices. Such reactions with the substrate polymer adversely affect the optical properties of the substrate, which may cause problems ranging from aberrations in the LCD to failure of the device.

To prevent interactions between the LCD material and the spacing members, the microstructured surface may be coated with a thin layer (about 500 to 2000 Angstrom) of silicon dioxide by vacuum deposition prior to contact with the liquid crystal or alignment layer materials. While the silicon dioxide layer provides an adequate barrier as deposited, formation of a complete LCD requires exposure of the substrate to elevated temperatures during, for example, alignment layer processing, storage, and post-fill annealing. Exposure to these elevated temperatures causes the silicon dioxide coating to fracture, particularly at high stress points, due to the large difference in coefficients of thermal expansion between the silicon dioxide coating and the polymer substrate. The fractures in the silicon dioxide layer provide areas of contact between the liquid crystal and the substrate. This may result in absorption of the liquid crystal by the substrate at these fracture points, causing local swelling of the substrate. The local swelling leads to failure of the display due to the uncontrolled optical retardation and disruption of the uniform spacing gap caused by the absorbed liquid crystal in the substrate.

Polymers that are impervious to liquid crystal mixtures and to alignment layer solvents may also be applied to the spacer members to form a barrier. These polymers can be chosen or formulated to have coefficients of thermal expansion that closely match that of the substrate polymer. Polymer coatings may be applied over the microstructured substrates disclosed by Wenz using methods such as coating and subsequent cross-linking of a thin liquid resin, or evaporation coating of a polymer layer, over the existing microstructure. However, such polymer coating methods are inadequate to simultaneously provide the required protection of the substrate and the required level of cell gap uniformity between the microstructured ridges. Thin coatings (<0.1 $\mu$m) do not provide an adequate barrier, whereas thicker coatings (>0.1 $\mu$m) do not replicate the microstructure within tolerances and thus cause display non-uniformities.

Another shortcoming with the Wenz approach is that it is not transferable to glass substrates or to substrates other than those that can be imparted with the microstructure. For such substrates, less reliable spacer means, such as fibers, glass beads, and photoresist ribs would need to be employed.

A major driving force for the advancement of electronic display technology is the ability to provide larger displays having higher resolution. Such advances cannot be made without the development of substrate materials and materials combinations that may be adapted to large area display applications and allow precise control of sub-micrometer dimensions.

SUMMARY OF THE INVENTION

The present invention provides a substrate element having a microstructured barrier layer between the substrate base material and the liquid crystal. The barrier layer both inhibits interactions between the liquid crystal and the substrate base material that would otherwise adversely affect the optical properties of the base material, and functions as a spacer between the substrate base and a second substrate element to ensure proper cell gaps across the LCD.

The present invention combines the functions of a substrate and a spacer into one substrate element. The element comprises a substantially flat substrate base material having selected optical properties and a microstructured barrier layer that provides the desired spacing. The substrate element thus developed is a two layer system, wherein the physical integrity of the system is provided by the underlying base polymer while the chemical stability and microstructured spacers are provided by an unreactive layer that is adhered to the substrate base. The present invention also comprises LCD devices using such substrate elements. The present invention also comprises electronic devices using liquid crystal displays incorporating such substrate elements.

More specifically, the present invention comprises a substrate element for use as a half-cell in making electrically addressable liquid crystal displays. The substrate element comprises a base sheet either of a polymeric material or of glass having a flat profile on at least one major surface. The substrate element further comprises a barrier layer having a flat profile on one major surface positioned adjacent to the flat surface of the base sheet and a microstructured profile on the opposing major surface. This microstructured profile comprises a plurality of spacing members, preferably a series of parallel ridges, each spacing member rising to a common level to support a second substrate element.

When incorporated in a display device, thin, transparent, conducting layers can be applied to the substrate element on the surfaces surrounding the microstructure on the barrier layer. The conducting layers allow the application of a voltage across selected portions of the uniformly spaced LCD cell gap. Other elements commonly associated with liquid crystal displays may also be associated with the substrate elements to provide a half-cell for making a useful display device.

The articles of the present invention are made by known molding techniques described and exemplified hereinafter which allow microstructure features to be molded integral with the barrier layer. The dimensions of the features can be molded to very tight tolerances and are reproducible without significant variation. These very precise spacing members integral with the barrier layer and precisely positioned over large areas allows the production of large area displays with uniform appearance over their entire area.

Having microstructured spacing members integral with the substrate barrier layer helps ensure a microstructured substrate element that can be made highly uniform over meter-sized areas thereby providing high optical uniformity. An integral microstructure can be made to electrically isolate adjacent conductors, thus eliminating costly and yield-reducing photolithographic steps. The LCD manufacturing process is simplified because the need to separately apply spacer beads or fibers or photolithographed dots or stripes is eliminated. In addition, the substrate base materials can be chosen for desired properties such as light weight and transparency without regard for reactivity with liquid crystal mixtures or alignment layer solvents. This invention may be used with the ferroelectric liquid crystals as well as the twisted nematic, super twisted nematic, cholesteric, and other liquid crystal materials requiring accurate and precise spacing control for application in high definition, large format, direct-view and projection displays.

DETAILED DESCRIPTION

The term "microstructure" as used herein refers to structural elements having dimensions characteristically measured in micrometers (e.g. from about 0.1 micrometers up to 100 micrometers). The term "microstructured" as used herein refers to a surface imparted with a microstructure using microreplication techniques such as those disclosed in U.S. Pat. Nos. 3,689,346, 4,244,683 and 4,576,850, which are incorporated herein by reference.

Figure 1:
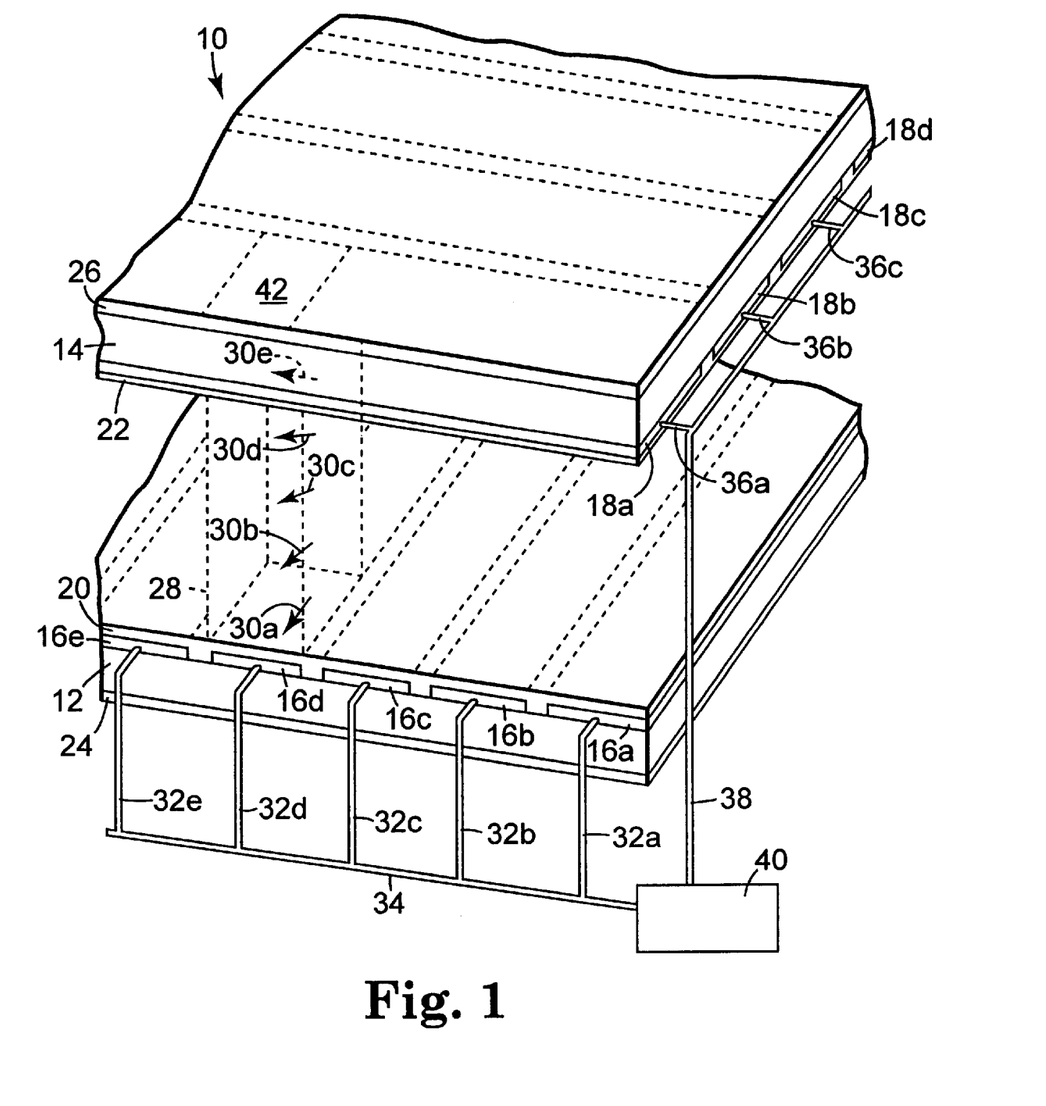
FIG. 1 is a diagrammatic, partial, isometric view of an illustrative liquid crystal display device and associated electronics.

As shown in FIG. 1, a typical twisted nematic or super twisted nematic display device 10 comprises a cell formed by placing a pair of transparent, planar substrates 12 and 14, in register, overlying and spaced apart from one another. The periphery of the substrates are joined and sealed with an adhesive sealant (not shown) usually applied by a screen printing technique to provide an enclosed cell. The shallow space or cavity between the substrates is filled with a liquid crystal material 28 just prior to final sealing. Conductive, transparent electrodes 16(a) through 16(e) and 18(a) through 18(d) are arranged on the inside surface of the substrates in either a segmented or X-Y matrix design (shown), as is well known in the art, to form a plurality of picture elements (pixels). Although only a few electrodes are shown, in practice a large number of electrodes are incorporated in the cell and the number will generally increase as the areal dimensions of the cell increase.

Alignment coatings 20, 22 are applied to portions of the interior surface of the liquid crystal display cell to cause a desired orientation of the liquid crystal material at its interface with the surface of the display. This ensures that the liquid crystal rotates light through angles which are complementary to the alignment of the polarizers associated with the cell. Polarizing elements 24, 26 are optional depending on the type of display (polarizing elements are required for twisted nematic and super twisted nematic displays, for example), and they may be associated with one or more surfaces of the display when used. A reflector element (not shown) may be associated with the bottom substrate 12 when a reflective rather than a transmissive display is desired. In that event, bottom substrate 12 may not have to be transparent.

The components and assembly techniques of liquid crystal displays as described above are well known. Details of assembly can be found in the literature such as "Liquid Crystals-Applications and Uses", Volume 1, *Bitendra Bahadur, Ed.,* World Scientific Publishing Co. Pte. Ltd. (1990), Chapter 7, "Materials and Assembling Process of LCDS."

Liquid crystal material fills the space between substrates 12 and 14, but for purposes of illustration, only a column of liquid crystal material 28 is shown corresponding to the area overlying common areas of the crossed electrodes 16(*d*) and 18(*a*). Arrows 30(*a*) through 30(*e*) show how the molecules of the liquid crystal are aligned in a 90 degree twist in a twisted nematic cell by the alignment layers 20, 22 in the absence of an electric field (other degrees of twist may be used for super twisted nematic cells). Arrows 30(*a*) and 30(*e*) also correspond to the direction of polarization of the polarizers 24 and 26, respectively.

Electrode leads 32(*a*) through 32(*e*) and 36(*a*) through 36(*c*) are shown connected to bus leads 34 and 38, respectively, which in turn are connected to addressing electronics shown schematically at 40.

Twisted nematic liquid crystal devices employing a small amount of a chiral additive have a helical or twisted molecular orientation as shown by arrows 30(*a*) through 30(*e*) in FIG. 1. When an electric field is applied to the liquid crystal material by electrodes incorporated into the device, the molecules re-orient to point in a vertical direction due to their electrical anisotropy. The molecules rotate polarized light when in the twisted state and pass light without rotation when in the untwisted vertical state. When used in combination with polarizers, this rotation of polarized light makes the display act as a light valve, either blocking or passing transmitted or reflected light. The surface 42 represents a pixel area which can be turned on or off by addressing electrodes 16(*d*) and 18(*a*) simultaneously. When individually addressable electrodes are incorporated into the display, the display device may display images.

Ferroelectric liquid crystals are also useful in display devices. These molecules have a polarization vector which reorients under the influence of an applied electric field. Thus, the application of an electric field ("field on condition") causes these liquid crystal molecules to orient in a characteristic way. Because they are bistable materials, they remain as oriented by the field even after the orienting electric field is removed ("field off condition"), which reduces power consumption. Application of a field of different polarity can re-orient the liquid crystal materials to a different orientation characteristic of the field.

There are also many other types of liquid crystal materials which may be employed as light valves when used in conjunction with this invention. These include, but are not restricted to, cholesteric liquid crystals, polymer dispersed liquid crystals, polymer stabilized cholesteric texture liquid crystals, and twisted nematic liquid crystals used in other switching schemes such as "in plane switching."

The electrodes may be addressed independently to create an electric field at selected pixels. In some addressing schemes, the electrodes are sequentially and repeatedly scanned at a rapid rate to provide moving images similar to television images. This requires "refreshing" the display at short time intervals to rapidly turn pixels on and off. In order to switch the pixels on and off rapidly with reasonable voltage levels, the layer of liquid crystal material should be uniformly thin. The spacing between the substrates becomes critical to achieve a uniform appearance.

To prepare large area displays with uniform spacing and resulting appearance, spacers comprising microstructure elements integral with the substrate have been employed as disclosed in U.S. Pat. No. 5,268,782 (Wenz), which is incorporated herein by reference.

Figure 2:
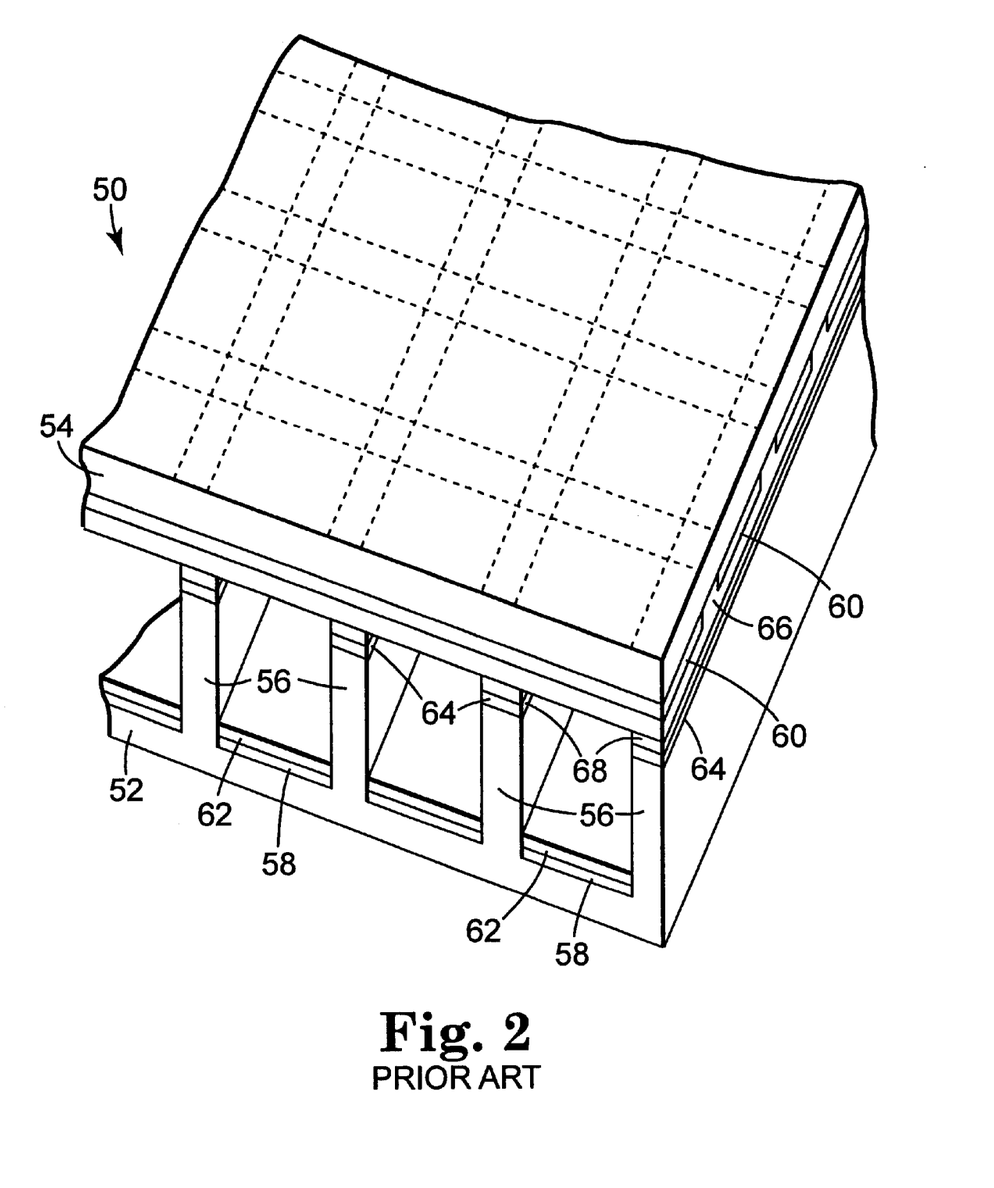
FIG. 2 is a diagrammatic, partial, isometric view of a prior art liquid crystal display device.

A portion of the liquid crystal display device disclosed by Wenz is shown in FIG. 2. The device 50 comprises a transparent bottom substrate 52 and a transparent top substrate 54. Microstructure spacing ribs 56 are integral with the substrate 52 and rise up to a common level to support the top substrate 54. Transparent conductive electrodes 58 and 60 are located on the interior of the bottom and top substrates, 52, 54, respectively, and are connected to a voltage source (not shown) for creating an electric field between opposed electrodes. Optional alignment materials 62, 64 and 66 are shown in various locations. The alignment material 64 results from the application of alignment layer 62 on bottom substrate 52 and is covered by an adhesive/sealant 68. Thus, the alignment material 64 performs no alignment function and can be eliminated if desired. The top substrate 54 is bonded to the tops of the spacing ribs 56 by the adhesive/sealant 68. The spacing ribs 56 together with the substrates 52 and 54 form a cavity in which liquid crystal material (not shown) is disposed before the cell is sealed at its periphery with an adhesive/sealant (not shown) to form a complete display device.

The substrate 52 is preferably a thermoplastic, polymeric material which can be molded using known microreplication techniques, is optically transparent and has reasonable dimensional stability under the conditions encountered during the manufacture and use of the display device. Thermoplastic materials which are useful for the substrate 52 include, for example, polycarbonate, polyvinyl chloride, polystyrene, polymethyl methacrylate, polyurethane polyimide and polysulfuric polymers, as well as other transparent thermoplastic polymers.

While suitable substrate materials provide the desired optical and structural properties, they often dissolve in or absorb either the liquid crystal mixture or the solvents used in the application of the alignment layer. Such reactions with the substrate material locally change the optical or physical properties of the substrate material, creating non-uniformities in the appearance of the display or causing failure of the display through, for example, breakage of the transparent conductor induced by polymeric swelling.

Polymeric substrates that react with liquid crystal mixtures or with alignment layer solvents may be protected by providing a barrier coating. Barrier coatings are thin layers of material that can be applied to the polymeric substrate at the interface between the substrate and the liquid crystal or optional alignment layer. The coating should resist diffusion of the liquid crystal and alignment layer solvent and thereby inhibit adverse reactions with the substrate material. The coating should also perform its barrier function without being so thick or uneven as to affect the uniformity of the cell gap across the display. One possible barrier coating comprises a silicon dioxide thin film that may be applied by known vacuum deposition techniques. For example, silicon dioxide films with thicknesses in the range of about 500 to about 2000 Angstrom may be applied over the microstructured substrate element disclosed by the '782 patent to Wenz. The silicon dioxide barrier film is impervious to the liquid crystal mixture or alignment layer solvents and may be evenly coated so that the uniformity of the cell gap across the display is not affected by the coating.

However, inorganic thin film barrier layers, such as silicon dioxide coatings, that can be deposited evenly have largely different coefficients of thermal expansion as compared to the polymeric materials that may be used to make the substrate. Typical inorganic films will have coefficients of thermal expansion of about $1 \times 10^{-6}$ to $5 \times 10^{-6}$ per ° C., while typical polymers have coefficients of thermal expansion greater than $1 \times 10^{-5}$ per ° C. Coefficients of thermal expansion for thermoplastics become increasingly large as the temperature approaches the glass transition temperature of the thermoplastic. Many processing temperatures approach the glass transition temperature for thermoplastics. For example, alignment layer curing is done above 150° C. and preferably above 180° C. Also, after filling the device with the liquid crystal mixture, there often is a post-fill annealing step performed at about 90° C. to 120° C. During elevated temperature processing, storage, and operation steps, (performed at about 100–150° C. for plastic cells), the polymer substrate and the inorganic barrier layer expand (during heating) and contract (during cooling) by different amounts, leading to cracking and fracturing of the barrier layer, especially at high stress points such as at the extremities of the microstructured spacing ridges or at discontinuities in the transparent conductor layer. Once fracturing has occurred, the inorganic coating can no longer work as a barrier.

Polymeric materials can also be employed as barrier coatings. A polymeric material may be formulated to have a coefficient of thermal expansion that matches or nearly matches that of the substrate material so that cracks and fractures are not formed in the barrier layer upon elevated temperature processing, storage, or operation. However, to obtain a high quality polymer film (uniform thickness, without pinholes, and without defects caused by small particulates), film thicknesses should be on the order of about 0.2 $\mu$m to more than 10 $\mu$m. Thus, polymer barrier layers may be employed successfully on substantially flat substrates because even coatings that do not affect the uniformity of the cell gap across the display can easily be obtained using commonly known techniques. When coating a microstructured substrate, however, the application of sufficiently thick films (those thicker than 0.1 $\mu$m) disrupts the cell gap uniformity, especially in devices requiring small cell gaps.

Figure 3A:
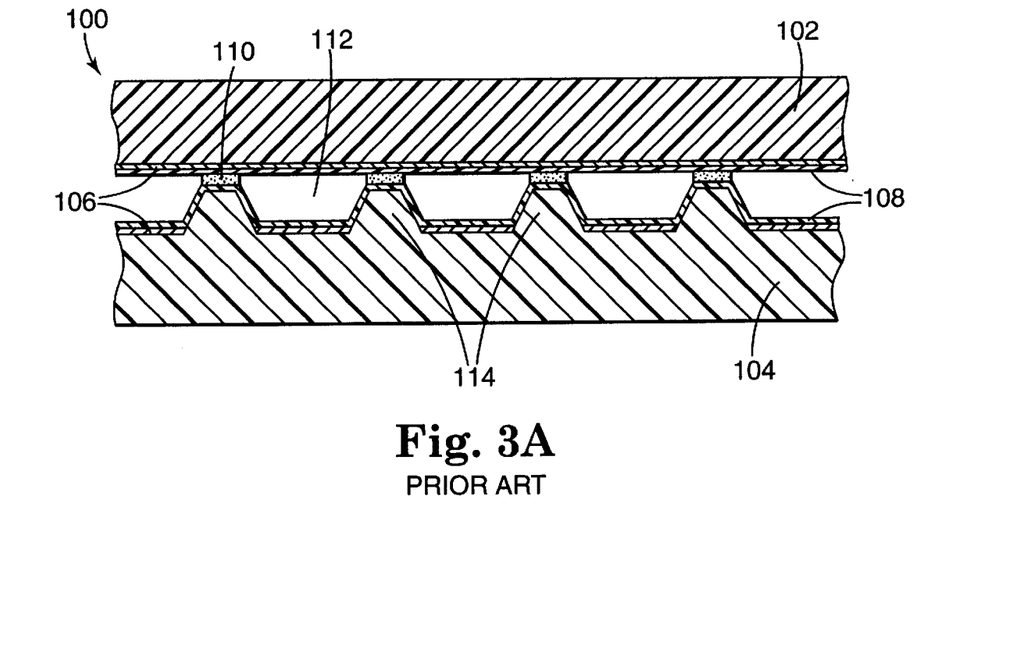
FIG. 3A is a schematic, cross-sectional view of the construction of the prior art liquid crystal display device having a substrate element with integral microstructure spacing elements.
Figure 3B:
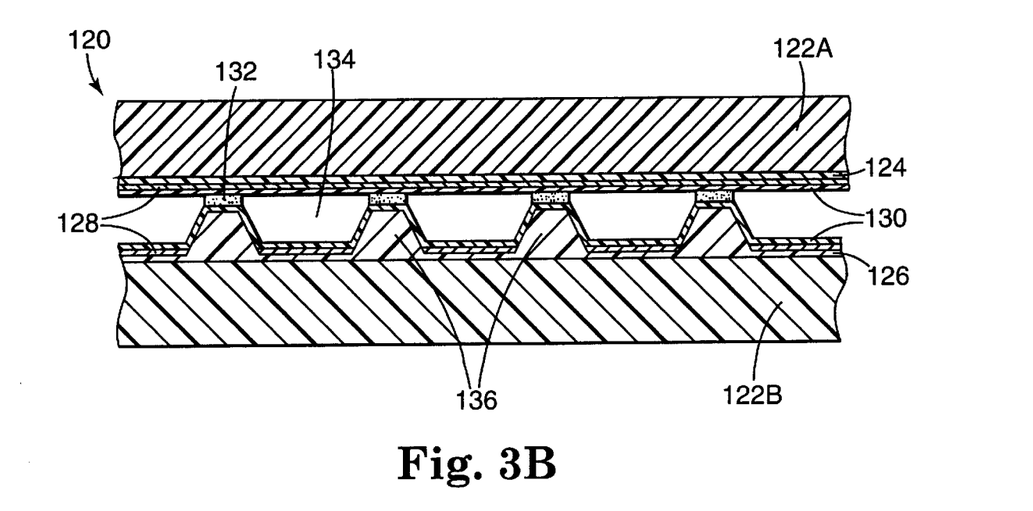
FIG. 3B is a schematic, cross-sectional view of the construction of the liquid crystal display device of the present invention having a substrate element comprising a base sheet and a microstructured barrier layer.

The construction of the substrate elements of the present invention is shown schematically in cross-section in FIG. 3B and is compared to the construction of the substrate elements disclosed by the '782 patent to Wenz as shown schematically in cross-section in FIG. 3A. It should be noted that the relative dimensions of the individual features of these constructions are not drawn to scale.

The Wenz construction 100 of FIG. 3A includes a microstructured bottom substrate 104 and a flat profile top substrate 102 set off from the bottom substrate 104 by microstructured ridges 114 that are physically and chemically integral with the bottom substrate. Each substrate has deposited thereon transparent conductive layers 106. On the microstructured substrate 104, the ridges 114 act to physically isolate the conductive layers so that there is no electrical shortage between the independently addressable cells. Optional alignment layer coatings 108 may also be applied over the substrate and conductive layers. The top substrate 102 is bonded to the ridges of the bottom substrate 104 by a thin layer of an adhesive 110 applied to the tops of the ridges. Each region 112 defined by the cell gap between the top and bottom substrate and separated by individual ridges is then filled with liquid crystal and the periphery of the construction is sealed to complete the liquid crystal display device. The construction 100 is in all ways analogous to the device 50 shown in FIG. 2.

The construction of the present invention is shown in FIG. 3B. The construction 120 comprises a top substrate base 122A and a bottom substrate base 122B having substantially flat profiles. The top substrate base 122A has applied thereto a thin barrier layer 124 that also has a substantially flat profile. The bottom substrate base 122B has applied thereto a thin barrier layer 126 having a microstructured profile comprising spacing members 136 that rise to a common height above the base of the barrier layer to create a uniform gap 134 across the device between the bottom and top substrates. Each barrier layer 124, 126 has applied thereto at least one thin, transparent, conductive layer 128 to provide independently addressable regions that define the individual cells of the display. An optional alignment layer 130 may be provided over the barrier layers 124, 126 and transparent conductive layer 128. The top substrate element 122A may be bonded to the bottom substrate element 122B by applying a thin layer of an adhesive material 132 to the tops of the microstructured spacing members 136 that are integral with the barrier layer 126 of the bottom substrate 122B.

The present invention thus employs a two-layer substrate element comprising a base substrate sheet 122B having a flat profile, and a microstructured barrier layer 126 that protects the base sheet from the liquid crystal and the alignment layer solvents. The barrier layer 126 also provides uniform height spacing members that ensure uniform cell gaps.

The substrate base 122 can be any material that has the desired optical properties, can be formed into a sheet with a thickness in the range 50 to 1500 $\mu$m having a substantially flat profile, and is stable up to the highest processing temperatures used to form a completed display (typically less than about 200° C.). The substrate base material is preferably a glass or a thermoplastic, polymeric material which is optically transparent and has reasonable dimensional stability under the conditions encountered during the manufacture and use of the display device. Thermoplastic materials which are useful in this regard include, for example, polycarbonate, polyvinyl chloride, polystyrene, polymethyl methacrylate, polyurethane, polyimide, polyacrylates, amorphous polyolefins, and polysulfuric polymers as well as other transparent thermoplastic polymers. Because the substrate base material is not imparted with the microstructured spacing members, it is not necessary that the substrate base material be moldable using known microreplication techniques, in contrast with the substrate element disclosed by the '782 patent to Wenz.

The barrier layer 126 can be any material that acts as a barrier to diffusion of liquid crystal mixtures and/or alignment layer solvents and that can be molded with microstructured spacing members by methods described hereinafter. The barrier layer material should also adhere to the substrate base material, either by itself or with the aid of an adhesive at the interface, without delaminating under conditions of processing, storage, or operation. In addition, the transparent conducting layer 128 should be able to adhere to the barrier layer 126. Other desirable barrier layer material properties include transparency, stability at elevated temperatures (up to about 200° C., depending on the processing conditions), scratch resistance, low or no birefringence, and low or no ionic contamination. It should be noted, however, that the optical requirements on the barrier layer are less severe than those on the substrate base because the barrier layer can be much thinner than the substrate base. A thinner barrier layer will tend to reduce any adverse optical effects that a thicker barrier layer may cause.

To provide barrier layers free of pinholes or other defects (such as those due to small particulates, i.e. less than 0.5 $\mu$m), the thickness of the barrier layer in the areas between the microstructured spacing members is preferably about or greater than 1 $\mu$m. This thickness is called the "land" thickness. The land thickness of the barrier layer is more preferably about or greater than 5 $\mu$m. However, the land should not be so thick that the barrier layer causes substantial discoloration in the display or otherwise adversely affects the optical properties of the substrate element. An appropriate land thickness will depend on the particular formulation of the barrier layer material.

The resistance of a barrier layer material to liquid crystal mixtures may be tested by measuring the diffusion of toluene through a 0.5 $\mu$m thick film of the material. Toluene may be used as a substitute for typical liquid crystal mixtures because it elicits similar responses from the polymer due to its chemical similarity to liquid crystal materials, but it does so more rapidly and at lower expense. The barrier layer material is considered impervious to the toluene if no diffusion through the film is detected after an exposure time of about 30 minutes. A similar test may be employed to measure the resistance of the candidate material to various alignment layer solvents.

The barrier layer material is preferably an acrylate and more preferably an acrylate curable by exposure to ultraviolet radiation during a molding process as is described hereinafter. The particular barrier layer material is best chosen or formulated based on the choice of substrate base material. Once the base material is chosen, an acrylate may be readily formulated to have adequate adherence to the base material and to have a coefficient of thermal expansion that closely matches that of the base material. When formulating the barrier layer material, close attention should also be paid to the properties identified above.

The barrier layer material may also enhance the structural stability of the substrate element. Because polymer-based substrate elements tend to be less rigid than glass-based substrate elements, polymer-based substrate elements often have a tendency to deform under local stresses. Although small deformations often do not affect the optical function of the display, they may cause cracking or breakage in the transparent conducting layers. A crack in a transparent conducting layer may cause an entire row of pixels to fail. By choosing a barrier layer material such as a cross-linked acrylate, the barrier layer may provide extra dimensional stability to the substrate element so that deformation of the substrate element under local stresses is less likely. Thus, the two layer construction of the present invention allows the formation of wholly polymer-based substrate elements that are less susceptible to deformation.

The microstructured spacing members may be any plurality of protrusions that rise to a common level and can support a second, opposing substrate element. Preferably, the microstructured spacing members comprise a series of parallel ridges that rise to a common level. Other types of protrusions that can perform the function of the spacing members may also be employed. For example, an array of post-like protrusions of various cross-sectional geometries can serve as spacing members. The microstructured spacing members can be provided by the microreplication and molding methods described hereinafter.

The lateral distance between the spacing members is measured, for example, from center to center of adjacent spacing members 136 in FIG. 3B. This dimension can vary considerably depending on the particular application for the display device. For example, the lateral distance between spacing members may range from about 5 $\mu$m up to 1000 $\mu$m. The width of the spacing members can range from about 1 or 2 $\mu$m up to several micrometers, e.g. about 25 $\mu$m or more. The upper limit is governed by the inactive area that can be tolerated in a given display, while the lower limit will depend on the required strength against delamination of a pair of bonded substrate elements (narrower spacing members produce less bonding area for opposing substrate elements). Typically, it is desired to have at least 50% active area in a display. That is, the projected surface area of the spacing members should occupy no more than about one-half of the total substrate surface in the display area. For a substrate where the spacing members are of substantially equal surface dimensions, the lateral spacing between spacing members would be at least about 1 times the width of the spacing member in the direction being measured and could be 10 times the width or more. In addition, it is generally desired to have at least about 10 pixels per cm (25 lines per inch) in a horizontal or vertical direction, up to about 120 or 240 pixels per cm (300 to 600 lines per inch) for high resolution displays, and up to about 400 pixels per cm (1000 lines per inch) for very high resolution displays.

The cell gap of the device is controlled by the height of the microstructured spacing members. The height of the spacing members above the land can range from about 1 or 2 $\mu$m up to several micrometers or tens of micrometers depending on the type of liquid crystal used. For example, surface stabilized ferroelectric liquid crystal displays typically require a nominal 2 $\mu$m cell gap.

Electrode materials useful in the present invention include commonly known transparent conducting oxides, such as indium-tin-oxide (ITO) and other materials commonly used in LCD's. Typically the conductive materials are vapor deposited onto the surface of the substrate, and in the case of the present invention directly onto the barrier layer, by sputtering or other commonly known techniques. Because vapor deposition techniques are not able to be directed with sufficient accuracy, conductive material may be deposited on the tops of the spacing members. If left in place, this conductive region could possibly short across the electrode regions on the opposing substrate element. Various techniques can be used to remove conductive material from the tops of the spacing members such as, for example, burnishing the tops of the spacing members after deposition, etching the conductive layer off while protecting the desired electrode surface with photoresist, etc. When the etching technique is used, a positive photoresist is applied to the entire substrate element surface. The photoresist on the tops of the spacing members must then be removed to expose the transparent conductor. This can be accomplished if the photoresist on the tops of the spacing members is, for example, selectively exposed to light either by the use of a mask, a laser selectively targeted on the spacing member tops, or by the use of a prism atop the spacing members so that light is transmitted to the photoresist at the prism/photoresist interface, but is reflected at the prism/air interface. After selective exposure, the photoresist on the tops of the spacing members may be removed. The exposed portions of the substrate are then subjected to an etchant to remove the conductive layer from the tops of the spacing members. After removal of the exposed conductive layers, the remaining photoresist may be stripped away and the alignment coating and/or other materials may be applied as desired.

The alignment compositions useful in the present invention are also well known in the art. These are various polymeric material applied from solvents by spin coating or other techniques commonly used which will supply a thin, uniform coating across the surface of the substrate element. Once applied, these materials may be dried and rubbed with cloth or other materials to provide an orienting surface which will align liquid crystal molecules in contact with the surface. A preferred alignment material is a nylon polymer which can be solvent coated and rubbed with cloth, such as velvet, to provide a useful alignment layer. The most commonly used alignment layer material is polyimide. Other liquid crystal alignment techniques include photoalignment using polarized light or ultraviolet radiation, the use of oriented silicon dioxide films as alignment layers, and other techniques known to skilled artisans.

The microstructured barrier layer of the present invention can be made by a microreplication technique utilizing embossing or injection molding. This process is described in U.S. Pat. Nos. 3,689,346, 4,244,683 and 4,576,850, the disclosure of the process being hereby incorporated by reference. The process involves the preparation of a microstructured mold master using conventional techniques. The mold master is then filled with a polymerizable composition which is exposed to radiation to rapidly polymerize the composition. The polymerized composition is then removed from the mold master to provide a polymerized article which has a microstructured surface replicated from the mold master.

In the barrier layer of the present invention, the land thickness is often too thin to provide structural support that would allow the barrier layer to stand alone. Thus, it is preferred to impart the barrier layer with the microstructure while the barrier layer resin is in contact with the substrate base sheet. In this way, the substrate base provides the physical stability for the substrate element. In addition, the barrier material can be cross linked with the substrate base during polymerization so that when the microreplication master is removed, the molded barrier layer is adhered to the substrate base sheet. One method of so forming a substrate element involves thermal coextrusion of the barrier layer with the base film wherein the barrier layer is subsequently imparted with the microstructure and then cooled.

Figure 4:
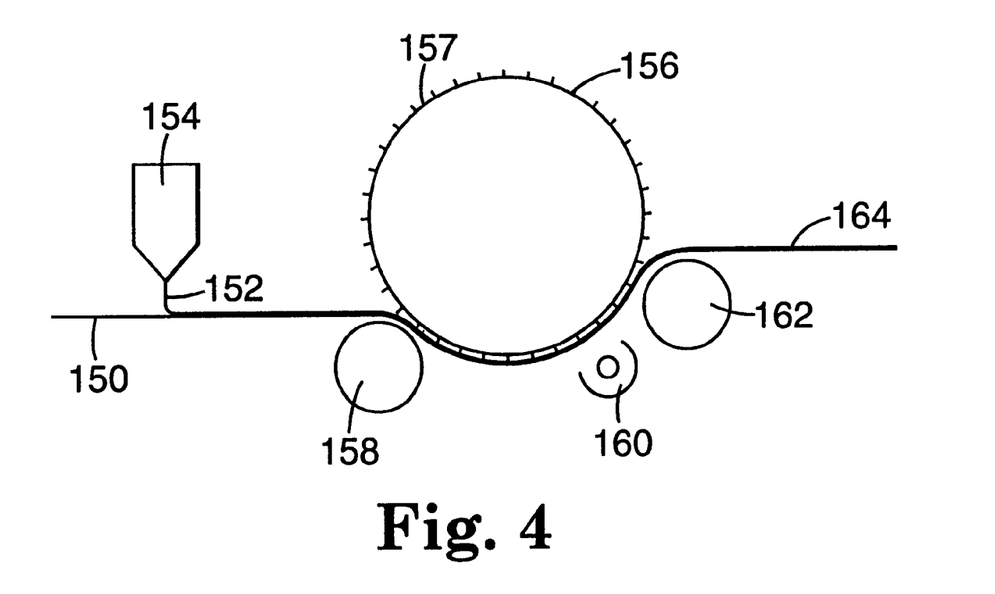
FIG. 4 is a schematic representation of a preferred method of making the substrate element of the present invention.

A more preferred method for making the substrate element of the present invention is shown schematically in FIG. 4. This process involves coating a liquid resin 152 that is curable using ultraviolet (UV) radiation onto a sheet of a substrate base material 150. Preferred materials for the resin 152 include UV curable epoxy acrylates. The means for applying the UV curable resin is shown schematically as 154. The substrate base sheet 150 coated with the barrier layer resin 152 is advanced toward a drum 156 and a nip roll 158 combination. The drum surface 157 is fitted with microreplication master plates that comprise a microstructure pattern that is the inverse of the pattern to be imparted into the barrier layer coating. Pressure is applied between the nip roll 158 and the drum surface 157. The ultimate land thickness of the barrier coating can be controlled by adjusting the pressure between the nip roll and the drum. Contact with the drum 156 is maintained by a second nip roll 162, and while still in contact with the drum surface, the liquid resin is exposed to UV radiation from a UV source 160. The barrier coating is thereby cured to form a film 164 comprising a microstructured barrier layer adhered to a base sheet, which may be cut with the appropriate dimensions to produce a substrate element suitable for inclusion in a liquid crystal display device.

Using the method shown in FIG. 4 to impart the barrier layer with microstructured spacing members comprising substantially parallel ridges, square substrate elements were made having display areas of about 4 cm$^2$ to about 16 cm$^2$. The spacing ridges had a nominal height in the range 1.7 to 5.6 $\mu$m, the width of the ridges was in the range 20 to 60 $\mu$m, and the spacing between the ridges was in the range 200 to 300 $\mu$m. In all of these ranges barrier layers were molded having uniform ridge heights to within 25 nm (0.025 $\mu$m), yielding uniform cell gaps to within 50 nm (0.05 $\mu$m) over the entire display area when bonded to another substrate element.

In order to provide optical uniformity over the microstructure-spaced liquid crystal display, it is necessary to ensure that the spacing members remain in contact with the mating substrate of the LCD cell so that the design spacing is maintained. One solution is to adhesively bond each spacing member to the mating substrate. This is not a simple matter since the spacing members may be only a few micrometers high while adhesives are usually coated to several micrometers in thickness. Conventional coating methods such as knife coating, gravure coating, etc., would produce too thick a coating and would also put adhesive in the channels between spacing members which would prevent filling with liquid crystal.

One method of applying adhesive to the ribs has been disclosed by the '782 patent to Wenz and is referred to as the "tack-off," or selective transfer, method. In this method an adhesive is thinned in a solvent, applied uniformly to a flat substrate (carrier), dried to a few tenths of a micrometer thickness, and then "tacked off" onto the tops of the microstructured spacing members by rolling the structured side of the microstructured surface across the thin adhesive layer. The thin adhesive never touches the channel portions of the microstructure and thus is not transferred into the channels. Once adhesive has been applied to the spacing members, the mating substrate can then be bonded to the microstructured substrate element to form a pair of half-cells that may be filled with liquid crystal and sealed at their periphery to form a completed liquid crystal display.

Although particular embodiments of the invention have been described and illustrated herein, skilled artisans will recognize that changes in form and detail may be made without departing from the spirit or the scope of the invention.

What is claimed is:

1. A substrate element for use in a liquid crystal display comprising:
    a base substrate comprising a material that reacts with a liquid crystal material;
    a barrier layer disposed on the base substrate and selected to resist diffusion of the liquid crystal material the barrier layer having a plurality of microstructured spacing members extending from the substrate element; and
    independently addressable electrodes positioned between the spacing members on the barrier layer.

2. The substrate element of claim 1, wherein the base substrate is polymeric.

3. The substrate element of claim 1, wherein the base substrate comprises a thermoplastic.

4. The substrate element of claim 1, wherein the barrier layer comprises an epoxy acrylate.

5. The substrate element of claim 1, wherein the barrier layer is curable by exposure to radiation.

6. The substrate element of claim 1, wherein the plurality of spacing members comprises a plurality of parallel ridges.

7. The substrate element of claim 1, wherein the plurality of spacing members comprises a plurality of post-like protrusions.

8. The substrate element of claim 1, wherein the spacing members extend an average amount in a range of 1 to 25 microns.

9. A liquid crystal display comprising:

a first half-cell and a second half-cell forming a pair of half-cells in overlying register with one another and confining a liquid crystal material therebetween, wherein the first half-cell comprises a base substrate comprising a material that reacts with the liquid crystal material, a barrier layer disposed on the base substrate and selected to resist diffusion of the liquid crystal material, the barrier layer having a plurality of microstructured spacing members extending from the substrate element, and a plurality of independently addressable electrodes positioned between the spacing members on the barrier layer.

* * * * *